United States Patent
Lindholm et al.

(10) Patent No.: US 9,189,242 B2
(45) Date of Patent: Nov. 17, 2015

(54) CREDIT-BASED STREAMING MULTIPROCESSOR WARP SCHEDULING

(75) Inventors: John Erik Lindholm, Saratoga, CA (US); Brett W. Coon, San Jose, CA (US); Jered Wierzbicki, San Francisco, CA (US); Robert J. Stoll, Los Altos, CA (US); Stuart F. Oberman, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 731 days.

(21) Appl. No.: 12/885,299

(22) Filed: Sep. 17, 2010

(65) Prior Publication Data
US 2011/0072244 A1 Mar. 24, 2011

Related U.S. Application Data

(60) Provisional application No. 61/245,626, filed on Sep. 24, 2009.

(51) Int. Cl.
*G06F 9/50* (2006.01)
*G06F 9/38* (2006.01)

(52) U.S. Cl.
CPC ............ *G06F 9/3851* (2013.01); *G06F 9/3836* (2013.01); *G06F 9/3885* (2013.01); *G06F 9/3887* (2013.01); *G06F 9/3889* (2013.01)

(58) Field of Classification Search
CPC ... G06F 9/3836; G06F 9/3851; G06F 9/3885; G06F 9/3887; G06F 9/3889
USPC .......... 712/220, 214; 345/501, 502; 718/102, 718/103, 107
See application file for complete search history.

(56) References Cited

U.S. PATENT DOCUMENTS

| | | | | |
|---|---|---|---|---|
| 7,310,722 | B2 * | 12/2007 | Moy et al. ..................... | 712/207 |
| 7,366,878 | B1 * | 4/2008 | Mills et al. .................... | 712/214 |
| 7,853,950 | B2 * | 12/2010 | Lewis .......................... | 718/102 |
| 2004/0019746 | A1 * | 1/2004 | Sager ........................... | 711/137 |
| 2004/0177038 | A1 * | 9/2004 | Tchan et al. .................... | 705/39 |
| 2005/0237329 | A1 * | 10/2005 | Rubinstein et al. ........... | 345/531 |
| 2007/0113053 | A1 * | 5/2007 | Jensen et al. .................. | 712/214 |
| 2011/0050713 | A1 * | 3/2011 | McCrary et al. .............. | 345/522 |
| 2011/0055479 | A1 * | 3/2011 | West et al. .................... | 711/118 |

OTHER PUBLICATIONS

Fung et al., "Dynamic Warp Formation and Scheduling for Efficient GPU Control Flow", Dec. 2007, Proceedings of the 40th Annual IEEE/ACM International Symposium on Microarchitecture, pp. 407-420.*

(Continued)

*Primary Examiner* — Andrew Caldwell
*Assistant Examiner* — Yuqing Xiao
(74) *Attorney, Agent, or Firm* — Artegis Law Group, LLP

(57) ABSTRACT

One embodiment of the present invention sets forth a technique for ensuring cache access instructions are scheduled for execution in a multi-threaded system to improve cache locality and system performance. A credit-based technique may be used to control instruction by instruction scheduling for each warp in a group so that the group of warps is processed uniformly. A credit is computed for each warp and the credit contributes to a weight for each warp. The weight is used to select instructions for the warps that are issued for execution.

23 Claims, 10 Drawing Sheets

(56) References Cited

OTHER PUBLICATIONS

Baatz et al., "Adaptive Scatternet Support for Bluetooth using Sniff mode", Nov. 2001, IEEE, Proceedings. LCN 2001. 26th Annual IEEE Conference on Local Computer Networks, pp. 112-120.*

Bensaou et al., "Credit Based Fair Queueing (CBFQ): A Simple Service-Scheduling Algorithm for Packet-Switched Networks", Oct. 2001, IEEE/ACM Transactions on Networking, vol. 9, No. 5, pp. 591-604.*

Lindholm et. al., "NVIDIA Testla: A Unified Graphics and Computing Architecture", 2008, IEEE Micro, vol. 28, Issue 2, pp. 39-55.*

Kanter, "Nvidia's GT200: Inside a Parallel Processor", Sep. 2008, from www.realworldtech.com/gt200/9/, pp. 1-3.*

* cited by examiner

CREDIT-BASED STREAMING MULTIPROCESSOR WARP SCHEDULING

CROSS-REFERENCE TO RELATED APPLICATIONS

This application claims priority benefit to United States provisional patent application titled, "Credit-Based Streaming Multiprocessor Warp Scheduling," filed on Sep. 24, 2009 and having Ser. No. 61/245,626.

BACKGROUND OF THE INVENTION

1. Field of the Invention

The present invention generally relates to streaming multiprocessor thread scheduling and more specifically to scheduling instructions for threads in groups to process the threads uniformly.

2. Description of the Related Art

Conventional multithreaded processors increase the size of a cache as needed to reduce the number of cache misses in order to achieve a desired performance level. Various techniques may be used to reduce the number of cache misses. As different threads execute the same program, some threads may advance ahead of other threads, reducing the locality of cache accesses and increasing the number of cache misses.

Accordingly, what is needed in the art is a system and method for improving cache locality and system performance for streaming multiprocessors.

SUMMARY OF THE INVENTION

A technique for ensuring instructions are uniformly executed for multiple threads in a thread group improves cache locality and system performance. Instruction by instruction scheduling for the warps may be controlled through the use of per-warp credit values so that a group of warps is processed uniformly. A credit is computed for each warp and the credit contributes to a weight for each warp. The weight is used to select instructions for the warps that are issued for execution. Additionally, cache access locality is improved by scheduling execution of cache access instructions in sequence. The weight may include other factors to improve the cache access locality of instructions that are selected for execution.

Various embodiments of a method of the invention for computing credit values for groups of threads include issuing a first instruction for execution by a first group of threads in a streaming multiprocessor during an issue cycle and determining a warp identifier associated with the first group of threads. A first warp credit for the first group of threads that is associated with the warp identifier is updated and a second warp credit for a second group of threads that is associated with a different warp identifier is also updated. The second group of threads has an eligible instruction ready for execution that was not issued for instruction in the streaming multiprocessor during the issue cycle.

Various embodiments of the invention include a system for computing credit values for groups of threads that are executed in a streaming multiprocessor. The system includes a warp scheduler and instruction unit that are configured to issue a first instruction for execution by a first group of threads in a streaming multiprocessor during an issue cycle and determine a warp identifier associated with the first group of threads. A first warp credit for the first group of threads that is associated with the warp identifier is updated and a second warp credit for a second group of threads that is associated with a different warp identifier is also updated. The second group of threads has an eligible instruction ready for execution that was not issued for instruction in the streaming multiprocessor during the issue cycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
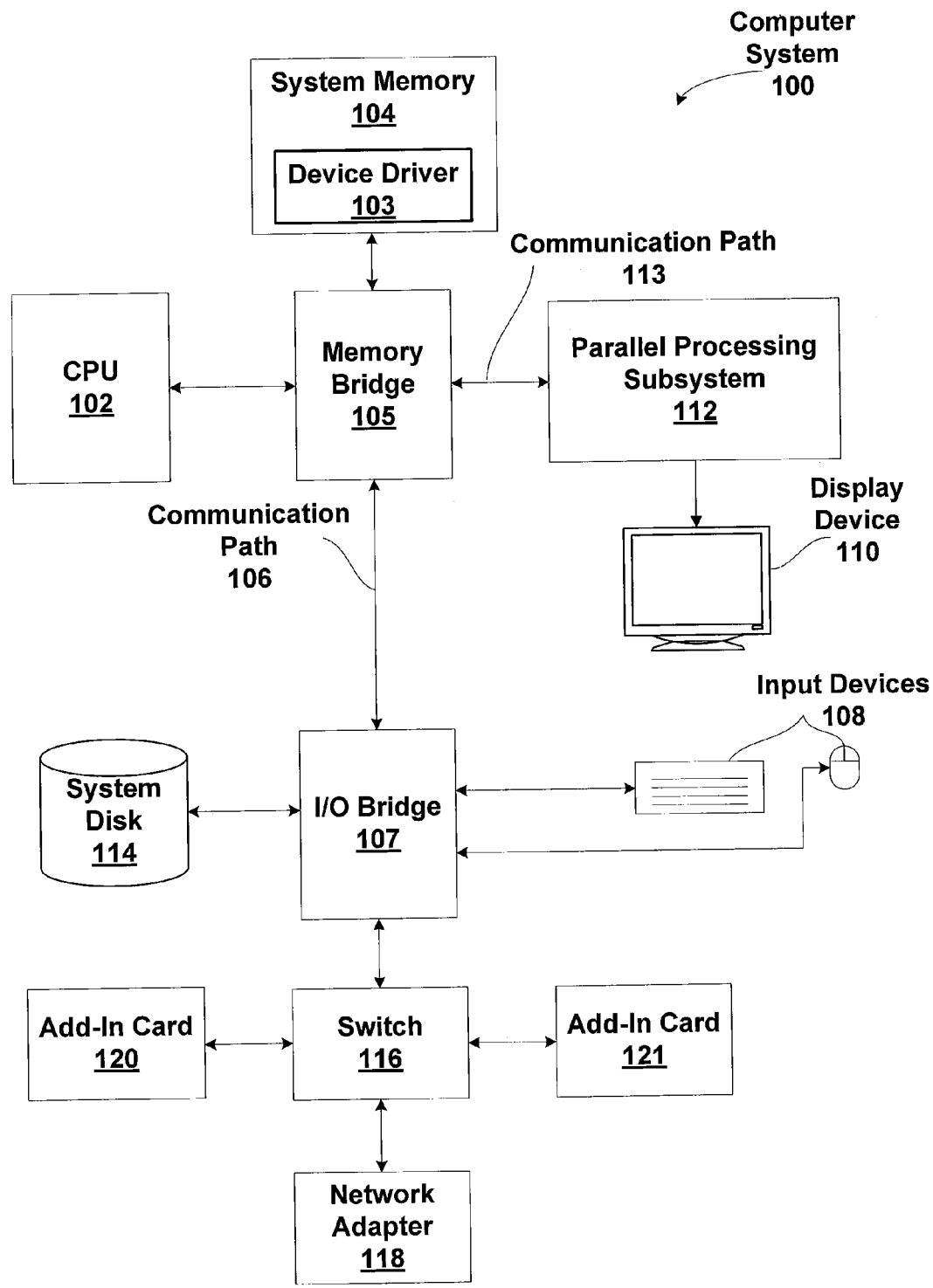
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interface (PCI) Express, AGP (Accelerated Graphics Port), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disk (CD) drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
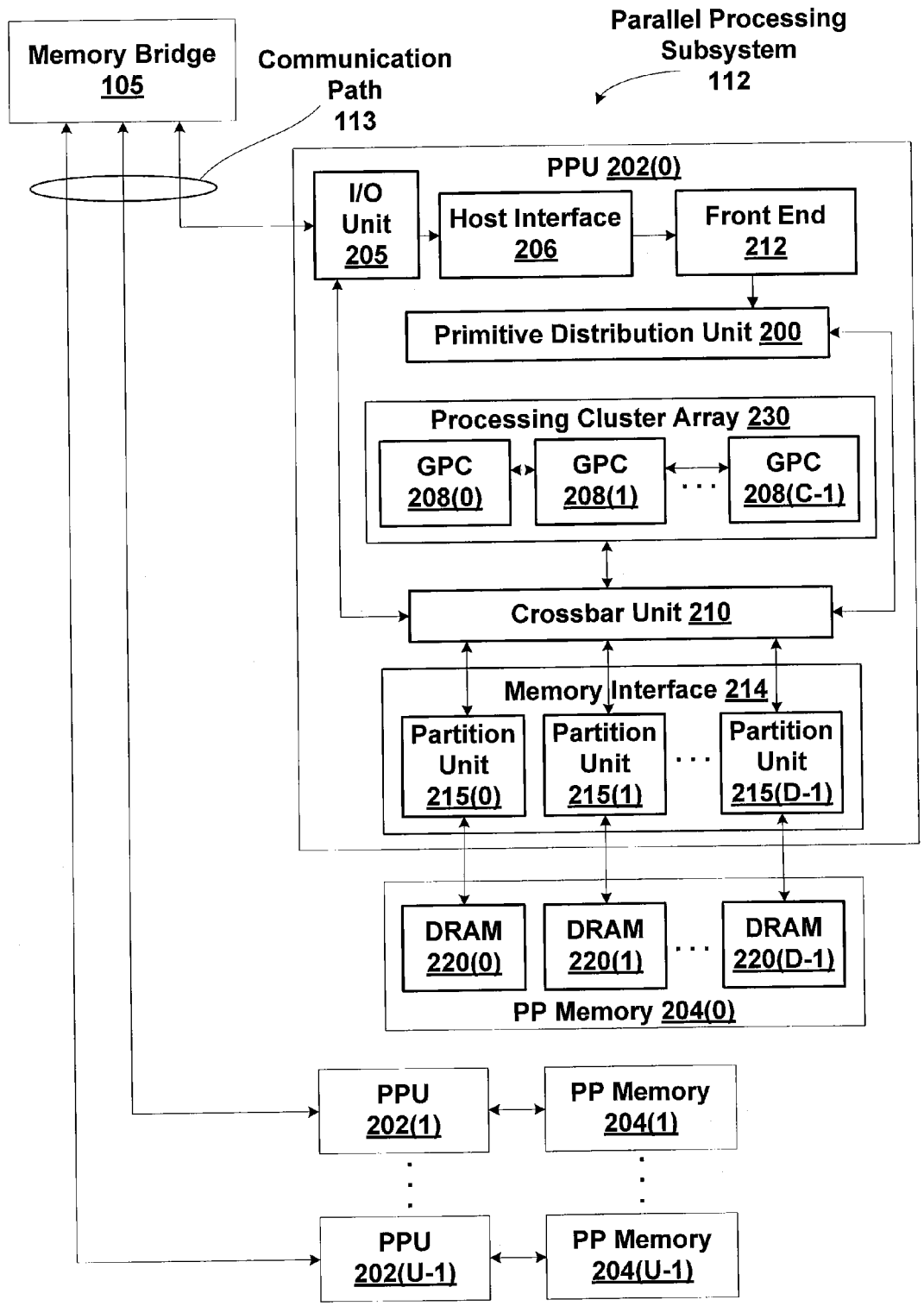
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
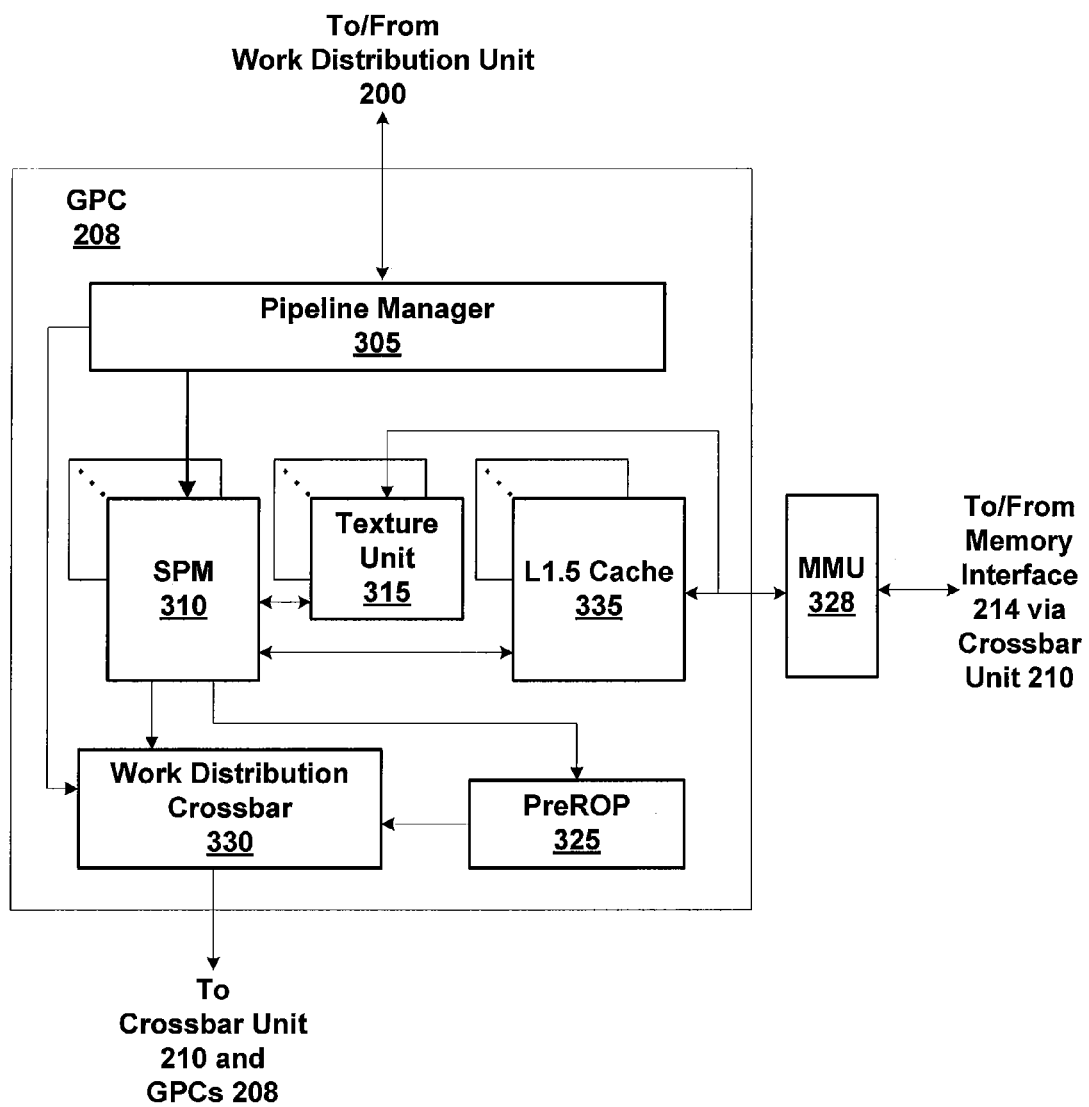
FIG. 3A is a block diagram of a GPC within one of the PPUs of FIG. 2, according to one embodiment of the present invention.

FIG. 3A is a block diagram of a portion of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input and output data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to follow divergent execution paths through a given thread program. Persons skilled in the art will understand that a SIMD processing regime represents a functional subset of a SIMT processing regime.

In graphics applications, a GPC 208 may be configured to implement a subset of the graphics pipeline (referred to as a primitive engine) for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310, where the distribution of work and data may be decoupled.

In one embodiment, each GPC 208 includes a number M of SPMs 310, where M≥1, each SPM 310 configured to process one or more thread groups. The series of instructions transmitted to a particular GPC 208 results in a collection of a certain number of concurrently executing threads across the parallel processing engines (not shown) within an SPM 310 that is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214 or each GPC 208 may include multiple translation lookaside buffers (TLBs) that store page table entries. The MMU 328 includes a set of page table entries (PTEs) used to map a virtual address to a physical address of a tile and optionally a cache line index. A complete set of PTEs may be stored in the parallel processing memory 204 and cached in MMU 328 or the multiple TLBs. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive tiles of data from SPM 310, where a "tile" is a rectangular region of screen space. In some embodiments a tile is 16*16 pixels. The preROP 325 divides the tiles into subtiles as needed for processing by SPMs 310. As each SPM 310 completes its assigned subtile, preROP 325 reassembles the subtiles into the original tiles and directs data, e.g., color, depth, coverage, and the like, to ROP units within partition units 215.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
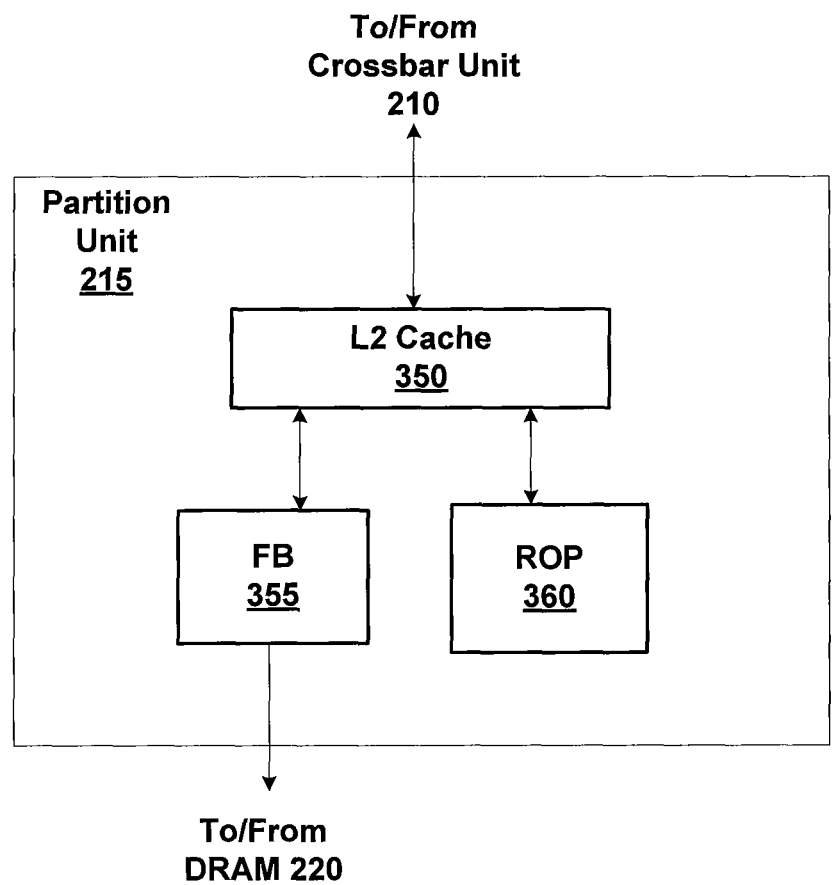
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
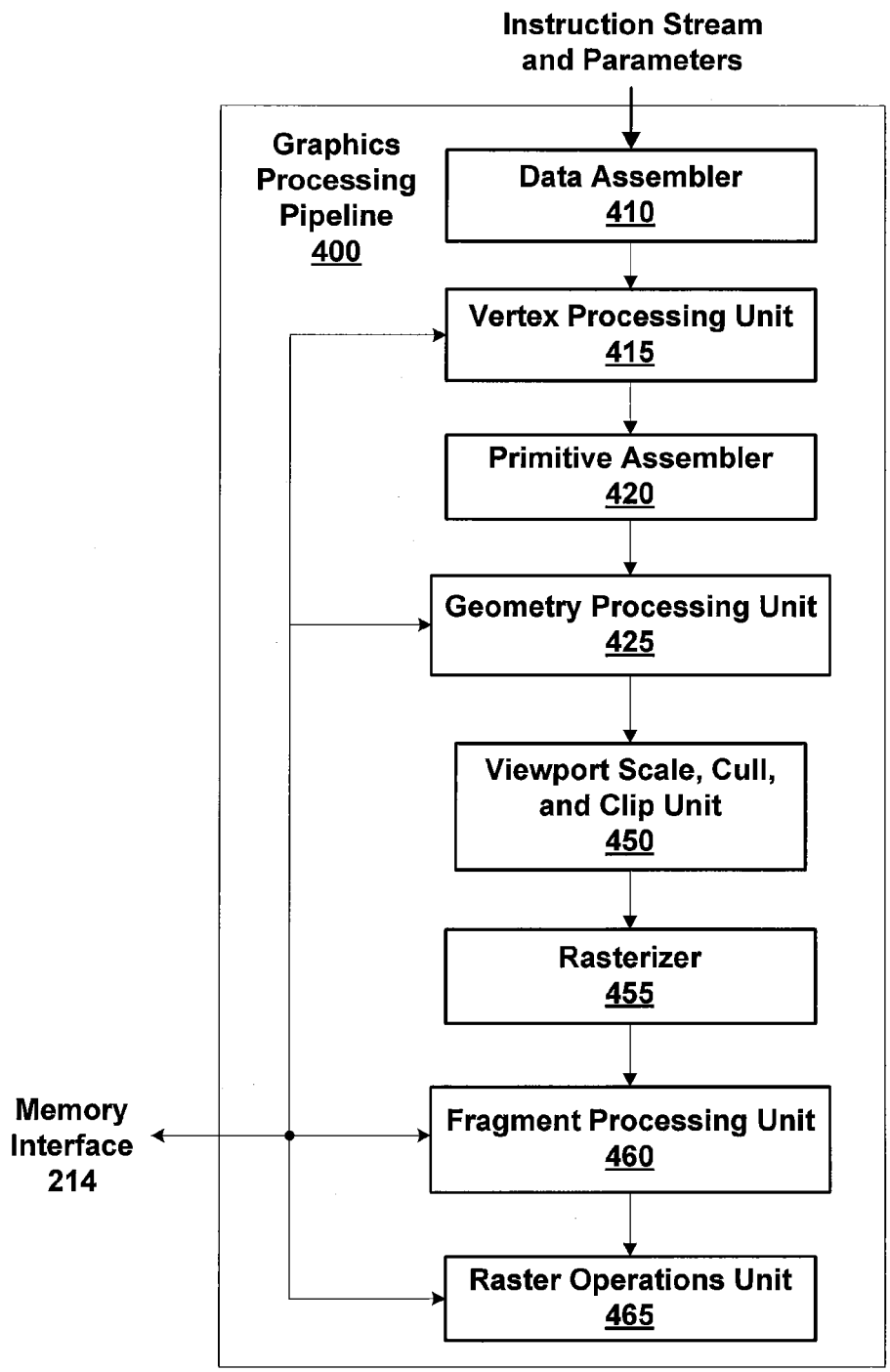
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations. Rasterizer 455 is configured to generate fragments for tiles. The tiles are sent to the GPCs 208, which are interleaved in screen space.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Credit-Based WARP Scheduling

Figure 5:
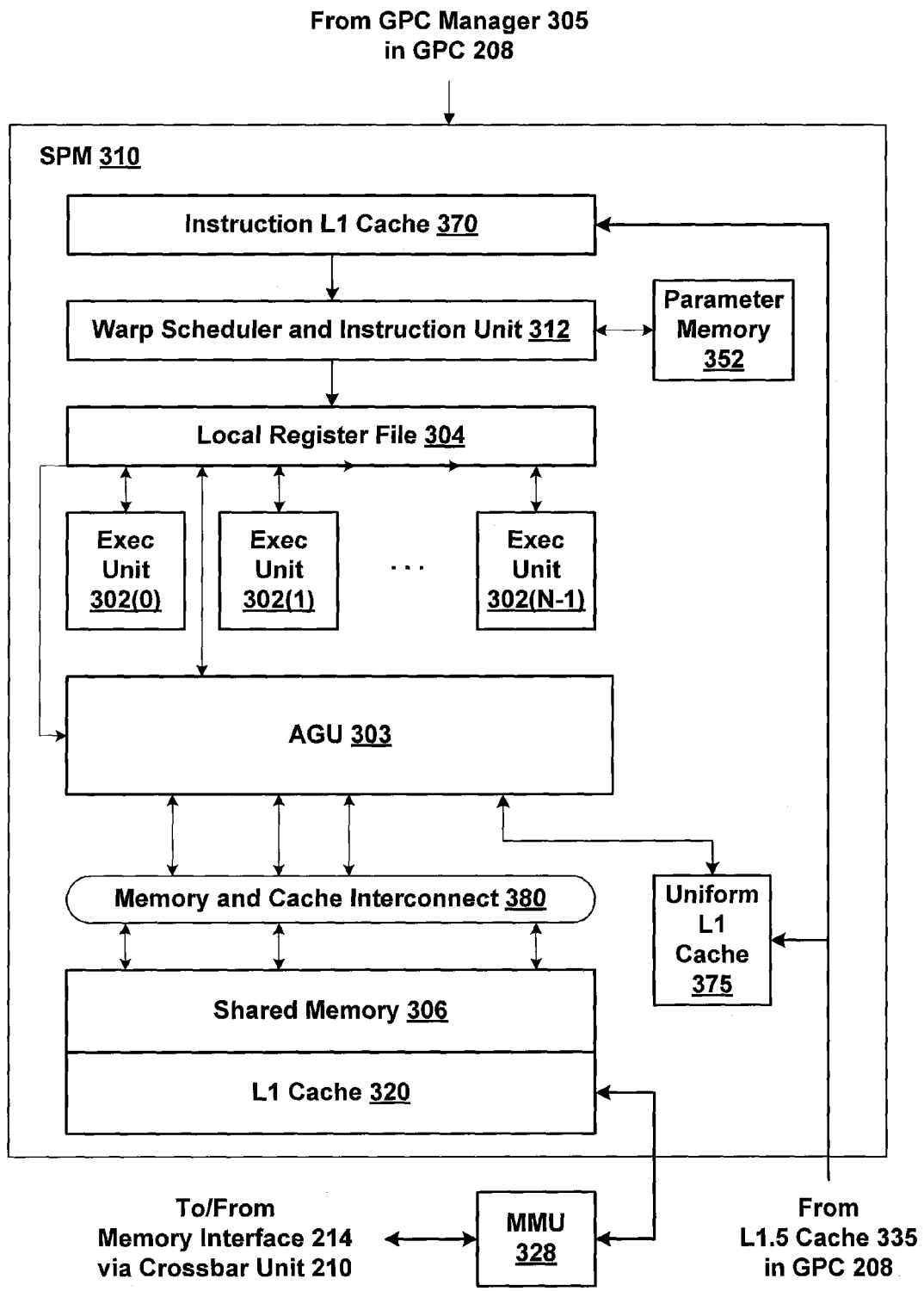
FIG. 5 is a block diagram of the SPM 310 of FIG. 3A, according to one embodiment of the present invention.

FIG. 5 is a block diagram of the SPM 310 of FIG. 3A, according to one embodiment of the present invention. The SPM 310 includes an instruction L1 cache 370 that is configured to receive instructions from memory via L1.5 cache 335.

A separate L1 cache (not shown) may be configured to store constants. A warp scheduler and instruction unit 312 receives instructions and constants from the instruction L1 cache 370 and controls local register file 304 and SPM 310 functional units according to the instructions and constants. Threads are executed in thread groups that are called warps, as described in further detail below. The SPM 310 functional units include N exec (execution or processing) units 302 and an address generation unit (AGU) 303.

SPM 310 provides on-chip (internal) data storage with different levels of accessibility. Special registers (not shown) are readable but not writeable by the AGU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by the AGU 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory 352 stores runtime parameters (constants) that can be read but not written by any CTA thread (or the AGU 303). In one embodiment, pipeline manager 305 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. There are per-warp registers in the warp scheduler and instruction unit 312 that store the current tile identifier, phase identifier, and texture op identifier for each warp. The warp scheduler and instruction unit 312 also includes a set of registers that store the tile identifier, phase identifier, and texture op identifier for a global grant value. The phase/tile/tex value for each warp is a localization characteristics value, meaning that warps having the same phase/tile/tex value are likely to have localized cache accesses. Therefore, scheduling execution of warps having the same phase/tile/tex values to occur in sequence or simultaneously is advantageous in terms of increasing cache access hits.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the AGU 303 has read-only access. In one embodiment, the area that implements the parameter memory is also used to store the CTA ID and grid ID, as well as CTA and grid dimensions, implementing portions of the special registers. The AGU 303 in SPM 310 is configured to generate and transmit an address provided for load and store instructions that may be specified in a unified memory space into an address in each distinct memory space. Consequently, an instruction may be used to access any of the local, shared, or global memory spaces.

The L1 Cache 320 in each SPM 310 can be used to cache private per-thread local data and also per-application global data. In some embodiments, the per-CTA shared data may be cached in the L1 cache 320. The AGU 303 is coupled to a uniform L1 cache 371, the shared memory 306, and the L1 cache 320 via a memory and cache interconnect 380. The uniform L1 cache 371 is configured to receive read-only data and constants for threads in a warp that access a common memory location via the L1.5 Cache 335.

When a shader program includes instructions that access the local register file 304, shared memory 306, L1 cache 320, and uniform L1 cache 375 the scheduling of the instructions is straightforward since the latency of the exec units 302 is deterministic. Instructions with data dependencies can be scheduled so that the operands produced by a previous instruction will be available. When instructions require data that is read via MMU 328, the scheduling of those instructions is more complicated. In particular, the scheduling of texture read operations (TEX ops) is challenging since each TEX op may have a very high latency, e.g., hundreds of clock cycles.

A typical pixel/compute shader program may be broken up into basic blocks (herein called "phases"). A phase identifier indicates a sequence of instructions for execution in the SPM 310 that is the last sequence of instructions in a program or includes a cluster of non-dependent cache access instructions. For example, each phase contains some amount of math operations followed by a number of non-dependent TEX ops (herein called a "texture cluster or texture batch"). It is advantageous to cluster TEX ops to allow hiding of the texture latency. Dependent TEX ops should be in different phases. A texture op identifier indicates a particular texture operation that reads texels using a cache access instruction.

The SPM 310 supports several concurrent threads of execution that are organized in thread groups, i.e., warps, of N threads that are scheduled as a SIMD unit in the SPM 310. In some embodiments, up to 1536 threads of execution are supported, organized as 48 warps of 32 threads. The warps may be split into two equal sized sets of warps, where each set is referred to as a pod that may be independently scheduled. The warps are typically executed in first in/first out sequence, and are commonly grouped into pixel tiles or CTAs. The warp scheduler and instruction unit 312 shepherds groups of warps through the SPMs 310 as uniformly as possible over the lifetime of the warps in the same group. Maintaining the grouping during execution of the warps in a group is important to benefit from locality of cache accesses. A credit-based technique may be used to control instruction by instruction scheduling for each warp in a group so that the group of warps is processed uniformly. A credit is computed for each warp and the credit contributes to a weight for each warp. The weights are compared and an instruction is issued for the warp having the greatest weight. Additional factors may also contribute to the weight, such as a texture locality value (TILE.PHASE.TEX value), an age of a tile/CTA for each warp, and a factor indicating if a processing pipeline is oversubscribed.

A compiler is configured to organize a shader program into phases and assign a phase ID to each phase. The phase ID is one component of the texture locality value (PHASE) that may contribute to the weight for a warp. The warp inherits the phase ID when executing the corresponding portions of the shader program. The warp scheduler and instruction unit 312 determines the tile/CTA that each warp belongs to and the tile/CTA is another component of the texture locality value (TILE) that may contribute to the weight for a warp. The warp scheduler and instruction unit 312 may be configured to only allow warps in a particular phase (based on the phase ID) to issue instructions that require a cache access. Warps that are executing a different phase are not executed. Once a tile/CTA is done executing a particular phase, another phase of the shader program may acquire the grant and warps matching that phase may be executed.

In some embodiments a warp cannot contain more than one tile, so a tile is processed as 1+ warps. In other embodiments one or more tiles may be processed by a single warp. A subtile is a part of a tile that has been split off due to capacity constraints or other reasons. The SPM 310 treats a subtile as a distinct tile. A texture pipeline begins with the texture unit 315 (see FIG. 3A) where the texture address is computed, the texture address is then provided to L1.5 cache and output to MMU 328 and DRAM 220 as needed to return the texture data to the L1.5 cache and the texture unit 315 where the texture data is filtered to produce texture values. To improve coherency in the texture pipeline, the SPM 310 sends all warps from a tile for a specific texture request contiguously. When texture requests from a single instruction are executed across all the threads of a tile, the requests are likely to access memory with a high degree of spatial locality. Therefore, a smaller texture cache may used in conjunction with the scheduling constraint to reduce the number of misses and achieve a performance similar to a larger cache used without applying the scheduling constraint to the texture requests. This scheduling constraint is referred to as the "textile" contract between SPM 310 and texture unit 315. The SPM 310 contains multiple tiles, and since these tiles are not necessarily contiguous in screen space, there may be no texture cache access benefit, in terms of locality, to grouping multiple tiles together.

A compiler is responsible for organizing the shader program into different phases based on the operations performed by the instructions and dependencies between the different instructions. A first phase, phase0, may contain initial math ops and a first texture cluster (phase0 texture ops). A second phase, phase1, may contain math ops that depend on the phase0 texture ops and then a second texture cluster (phase1 texture ops). A third phase, phase2, may contain math ops that depend on the phase1 texture ops and then the third texture cluster (phase2 texture ops). A last phase, phase3, may contain final math ops that depend on the phase2 texture ops.

Note that phase transitions are points of potential texture pipeline stalling due to large texture latency (although there may be some non-dependent math ops following a texture cluster). Phase transitions are detected to improve tile scheduling. One technique of identifying the phase transitions is to increment a phase counter per warp. Each warp is also associated with a tile and the tile has a unique tile identifier indicating a region of an image that is processed by the warp. The textile contract requires differentiation between tiles and between different tex clusters for a particular tile. This is done by a Tile id (identifier), a Phase counter, and a TEX counter. The TILE id is fixed for a warp and cannot be modified. The TEX counter and Phase counter are controlled by shader instructions that specify a texture operation (TEX op). Specifically, a TEX.t (TEX op with a .t modifier) denotes an increment of the TEX counter (after TEX issue) and a TEX.p (TEX op with a .p modifier) denotes the increment of the PHASE counter (after TEX issue). A TEX.p also sets the TEX counter to 0. The TILE.PHASE.TEX value for a warp may be computed using a hash function with the inputs of the Tile id, Phase counter and TEX counter. In one embodiment the Tile id is 6 bits, the Phase counter is 5 bits, and the TEX counter is 3 bits that are appended to produce a 14-bit TILE.PHASE.TEX value. The TILE.PHASE.TEX value may be configured to wrap when it is updated and overflows. Any warp having a TILE.PHASE.TEX value that matches a global grant value corresponding to the TILE.PHASE.TEX currently granted by the SPM 310 may be allowed to issue TEX ops. The global grant value is a copy of the TILE.PHASE.TEX value for the first warp that issues with a new grant value (a new grant is allowed when no warps having the current grant value are found). In one embodiment, the warp grant values may be configured to wrap when updated and exceeds a maximum value that can be represented, i.e., overflows. Importantly texture operations are affected by the grants for issuing and math operations do not participate in the grants for issuing an instruction. Other operations having coherency requirements may also be affected by the grants for issuing.

Figure 6A:
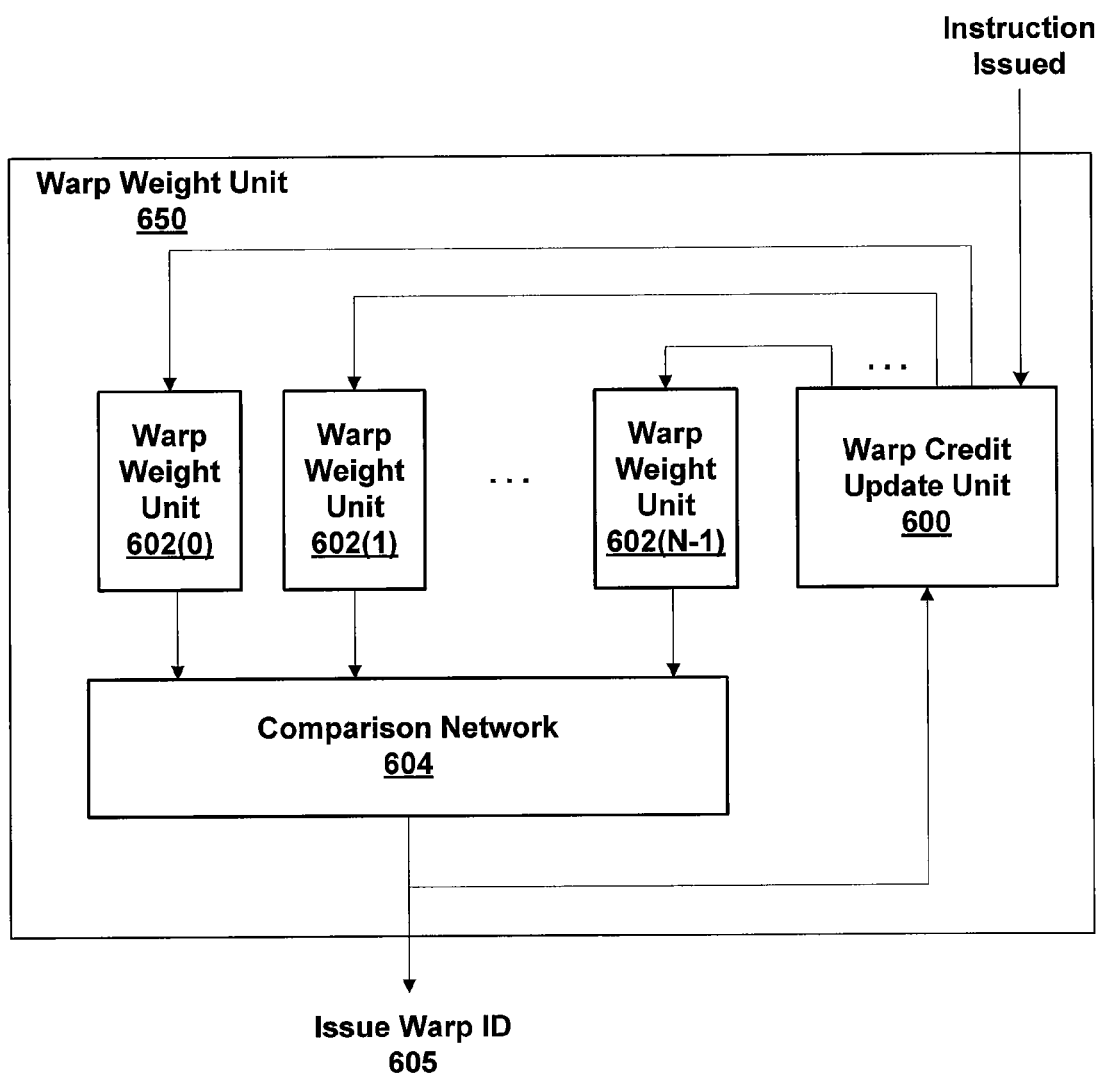
FIG. 6A is a block diagram of a warp weight unit, according to one embodiment of the present invention.

FIG. 6A is a block diagram of a warp weight unit 650, according to one embodiment of the present invention. The warp weight unit 650 is included in the warp scheduler and instruction unit 312. The warp weight unit 650 includes a warp credit update unit 600, a comparison network 604, and a warp weight unit 602 for each of N warps. The warp weight unit 650 receives an instruction issued input that indicates when an instruction is issued for a warp. The warp credit update unit 600 controls the updating of a credit value that is output by the warp weight units 602 for each warp. The comparison network 604 compares the credit values output by the warp weight units 602 outputs an issue warp ID 605 for the warp having the greatest credit value. The issue warp ID 605 is fed back to the warp credit update unit 600 and used to determine how the credits are updated when an instruction is issued. In some embodiments the credit values are used in combination with other values and the warp weight units are configured to determine a weight for each warp.

The warp credit update unit 600 may be configured to implement an accounting system where a warp that issues for execution of an instruction (issuing warp) has a credit decremented and the non-issuing warps have their credits incremented. Warps that do not issue therefore build up larger credits which improve their chance of issuing. Since the credits of issuing warps are not reset, a history of weight decrement/increment is maintained by the credit value.

In one embodiment, newly launched warps start out with a credit of zero and the warp credit update unit 600 is configured to ensure that the average credit of all warps is zero for every update of the warp credit values. Maintaining an average credit of zero reduces the effective range of the credit values (since the credits have a finite range) and prevents the average of the credits from drifting over time.

In one embodiment, a slushfund is used to ensure that the sum of all warp credit values and the slushfund is always zero. When a warp terminates, the unused credit value of the warp is deposited into the slushfund. The slushfund then distributes out any extra credit value back to the warps. More specifically, the issuing warp pays the slushfund, and, then, if the slushfund is positive, the extra credit value is distributed to the non-issuing warps.

The slushfund technique may be configured to function in a variety of ways. In one embodiment, each non-issuing warp increments its corresponding credit value by one and the issuing warp pays all of the non-issuing warps. The code shown in TABLE 1 may be used to compute the per-warp credit, where WARP_COUNT is the limited number of warps per SPM 310 and "victimized" indicates that the warp is a victim. The iwid is the ID of the issued warp. A warp is a victim if the warp is valid, did not issue, and the warp has instructions in an instruction buffer that could be issued (no conflicts or hazards that would prevent the instruction from issuing).

TABLE 1

```
count = 0;
if (slushfund > 0)
    for (i=0; i<WARP_COUNT; i++)
        if (warp[i] not issued && warp[i] victimized)  {
            warp[i].credit++;
            count++;
        }
slushfund -= count;
if (warp[iwid] issued)  {
    warp[iwid].credit -= count;
    slushfund += count;
}
if (warp[iwid] terminated)  {
    slushfund += warp[iwid].credit;
    warp[iwid].credit = 0;
}
```

In another embodiment using the slushfund technique, one non-issuing warp increments its corresponding credit value by one and the issuing warp decrements its credit value by one. A round-robin scheme may be used to select the one non-issuing warp. The code shown in TABLE 2 may be used to compute the per-warp credit, where rr_pointer is the round-robin selection mechanism.

TABLE 2

```
if (slushfund > 0)
    for (i=0; i<WARP_COUNT; i++)  {
        j = (rr_pointer + i) % WARP_COUNT;
        if (warp[j] victimized)  {
            warp[j].credit++;
            slushfund--;
            rr_pointer = (j + 1) % WARP_COUNT
            break;
        }
    }
if (warp[iwid] issued)  {
    warp[iwid].credit--;
    slushfund++;
}
if (warp[iwid] terminated)  {
    slushfund += warp[iwid].credit;
    warp[iwid].credit = 0;
}
```

In yet another embodiment using the slushfund technique, one non-issuing warp increments its corresponding credit value by a value related to the number of non-issuing warps that are victims and the issuing warp decrements its credit value by one. A round-robin scheme may be used to select the one non-issuing warp. The code shown in TABLE 2 may be used to compute the per-warp credit, where victim_count is the number of victim warps.

TABLE 2

```
if (slushfund > 0)
    for (i=0; i<WARP_COUNT; i++)  {
        j = (rr_pointer + i) % WARP_COUNT;
        if (warp[j] victimized)  {
            warp[j].credit += victim_count/2;
            slushfund -= victim_count/2;
            rr_pointer = (j + 1) % WARP_COUNT
            break;
        }
    }
if (warp[iwid] issued)  {
    warp[iwid].credit--;
    slushfund++;
}
if (warp[iwid] terminated)  {
    slushfund += warp[iwid].credit;
    warp[iwid].credit = 0;
}
```

Figure 6B:
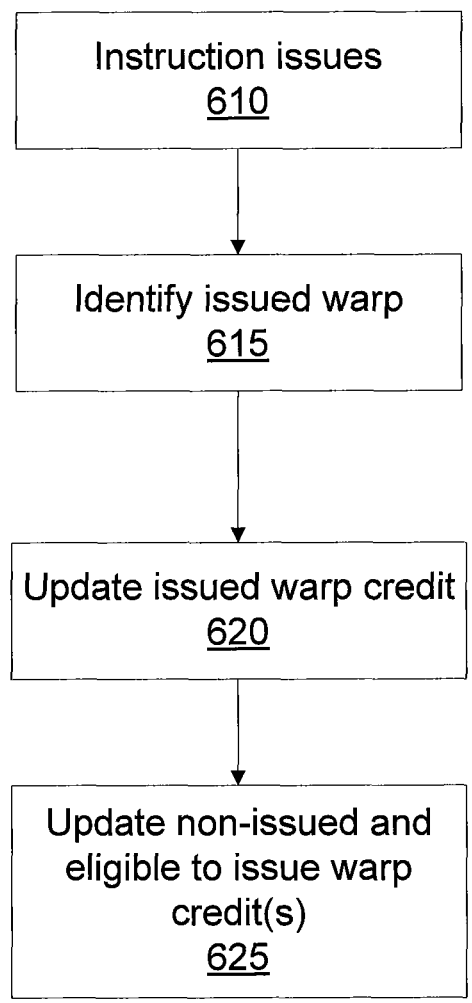
FIG. 6B is a flow diagram of method steps for computing per-warp credits, according to one embodiment of the present invention.

FIG. 6B is a flow diagram of method steps for computing per-warp credits, according to one embodiment of the present invention. At step 610 an instruction issues for a warp. At step 615 the issuing warp is identified. At step 620 the credit value corresponding to the issued warp is updated. At step 625 the credit value of at least one non-issued and victim (eligible to issue) warp is updated.

An alternative to the slushfund technique is to increment the credit value for each non-issued warp that is a victim by an immediate value that may be one (or larger) or by a value related to the number of victims in step 625 and reduce the credit value for the issuing warp by half in step 620. This technique is straightforward to implement and produces good results for maintaining texture cache locality.

Figure 7A:
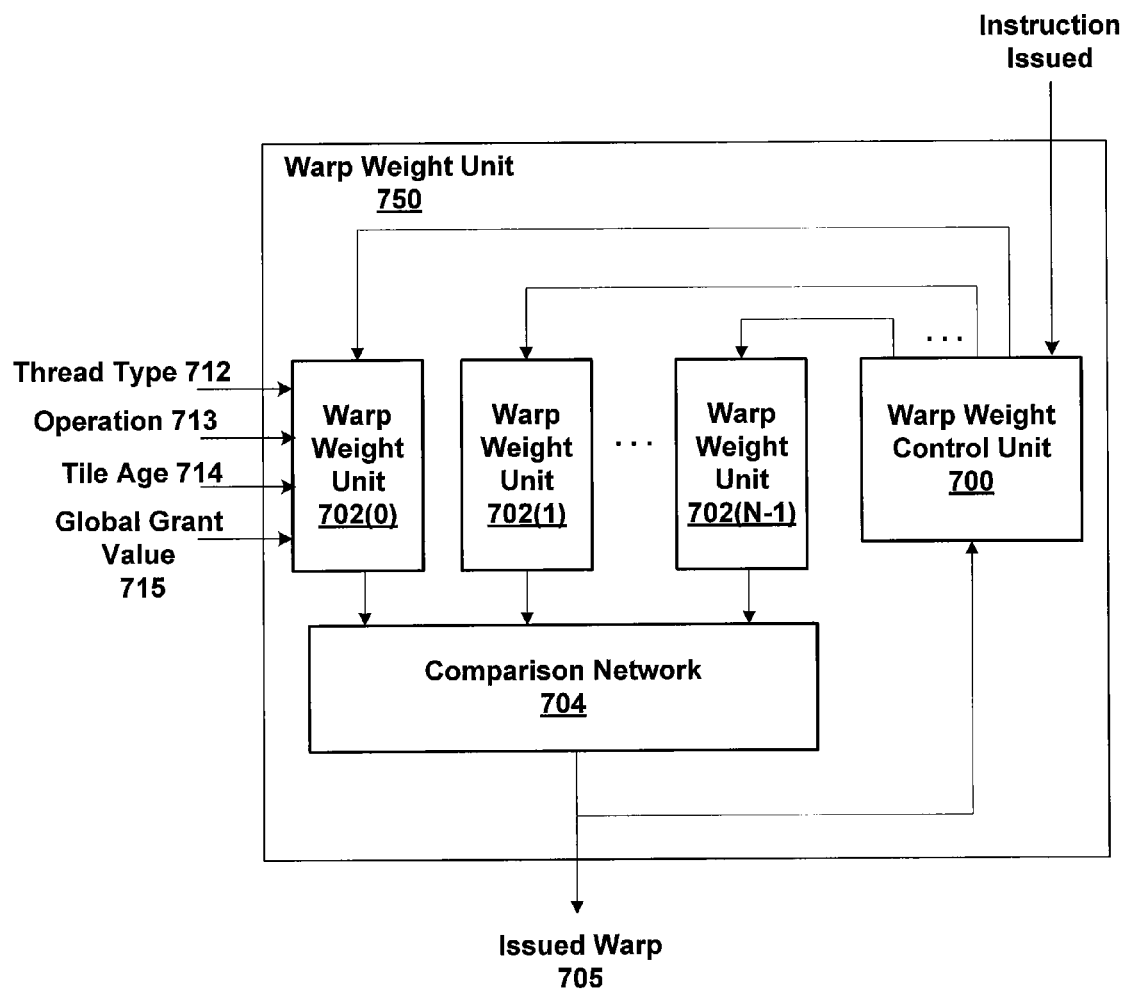
FIG. 7A is a block diagram of another warp weight unit, according to one embodiment of the present invention.

FIG. 7A is a block diagram of a warp weight unit 750, according to one embodiment of the present invention. The warp weight unit 750 is included in the warp scheduler and instruction unit 312. The warp weight unit 750 includes a warp weight control unit 700, a comparison network 704, and a warp weight unit 702 for each of N warps. The warp weight unit 750 receives an instruction issued input that indicates when an instruction is issued for a warp. The warp weight control unit 700 may be configured to control updating of a credit value for each of the warps using credit value update techniques previously described in conjunction with FIGS. 6A and 6B. The warp weight unit 750 also receives a thread type 712, operation 713, and tile 714 that are factors contributing to the weight for each warp. The warp weight control unit 700 controls the updating of a weight value that is output by the warp weight units 702 for each warp. The comparison network 704 compares the weight values output by the warp weight units 702 and outputs an issue warp ID 705 for the warp having the greatest weight value.

The weight for each warp may be adjusted by each warp weight unit 702 based on the computed credit, thread type 712, operation 713, tile age 714, and/or global grant value 715. In one embodiment a weight is constructed for each warp that includes a single bit indicating that the warp is being replayed or that the TILE.PHASE.TEX for the warp matches the global grant value 715. The weight may also include a single bit indicating whether or not the target pipeline is oversubscribed (based on the operation 713) and may include bits indicating the tile/CTA age. Finally, the weight may also include the credit value computed for the warp. A warp may be replayed as many times as required to execute while avoiding conflicts (memory bank access conflicts). Whenever a conflict is detected, the instruction to be executed for the warp is reissued. The warp is then allowed to accumulate credits as if the warp is victimized in order to increase the credit value during the duration of the replaying and allow the warp to "catch up."

The thread type 712 specifying the type of thread, e.g., pixel, vertex, or the like. The operation 713 specifies the type of operation to be performed by the instruction, and the operation determines whether the warp is a dual issue or single issue. A dual-issue instruction may be executed by any processing pipeline and a single issue instruction may not be executed by any type of processing pipeline. For example, a first pipeline may be configured to execute a reciprocal instruction and a second pipeline may not be configured to execute a reciprocal instruction. The weight may be used to balance the dispatch rate of single-issue instructions by tracking the number of single-issue instructions issued to the different types of processing pipelines. In one embodiment, when the number of single-issue instructions issued to a particular pipeline type is greater than or equal to a first threshold value, the particular pipeline type is marked as oversubscribed. When the number of single-issue instructions issued to a particular pipeline type is greater than or equal to a second threshold value, the particular pipeline type is marked as ineligible to receive instructions. Importantly, when the first threshold is reached the particular pipeline type is deprioritized and when the second threshold is reached no more instructions are issued to that particular pipeline type. In one embodiment, the first and second threshold values are programmable and default values of 6*N (where N is the number of pipelines of the particular pipeline type) and 14*N, respectively, are defined.

The global grant value 715 is the TILE.PHASE.TEX currently granted by the SPM 310 that controls which warps are allowed to issue TEX ops. The tile age 714 is the tile/CTA age and the weights may be adjusted to favor older tile/CTAs. An exact tile/CTA may be tracked for each warp beginning when the tile/CTA launches until the tile/CTA finishes being processed by the warp.

The code shown in TABLE 3 may be used to compute the per-warp weight, where THREAD_TYPE_PIX identifies a thread as a pixel thread type. The TILE.PHASE.TEX value for a warp includes the TILE portion as tthash.tile and the phase portion as tthash.phase. The TILE and PHASE are compared with the corresponding portions of the global grant TILE.PHASE.TEX value, SM.tthash.tile and SM.tthash. phase. When the TILE.PHASE for the warp matches the TILE.PHASE of the global grant, the weight for the warp is increased by WARP_TEXTILE_BONUS. The parenttile.index specifies the age of the parent tile and the weight for the warp is increased by the age scaled by WARP_TILE_AGE_SCALE. The weight for a warp is also increased based on the type of warp using WARP_MSLOT_BONUS. When an instruction for a warp is dual issue instruction (warp☐.op.pipetarget matches DUAL_ISSUABLE). The weight of a warp is increased by WARP_OP_BONUS when the target pipeline of the instruction to issue for a warp specifies a pipeline that is not oversubscribed.

TABLE 3

```
    warp[ ].coweight = warp[ ].weight;
// warp textile adjustment
    if (warp[ ].type == THREAD_TYPE_PIX)
      if (warp[ ].tthash.tile == SM.tthash.tile &&
          warp[ ].tthash.phase == SM.tthash.phase)
        warp[ ].coweight += WARP_TEXTILE_BONUS;
// warp parent tile age adjustment
    if (warp[ ].type == THREAD_TYPE_PIX)
      warp[ ].coweight += WARP_TILE_AGE_SCALE *
        warp[ ].parenttile.index;
```

TABLE 3-continued

```
// warp type adjustment
    warp[ ].coweight += WARP_MSLOT_BONUS[warp[ ].type];
// warp op adjustment (2 math pipes: MAD and SFU)
    for (balance=j=0; j<dsm->QueueCount;   j++)   {
      if (dsm->Queue[j].dual_issuable)
        ;
      else if (dsm->Queue[j].pipetarget == CID_MAD)
        balance++;
      else if (dsm->Queue[j].pipetarget == CID_SFU)
        balance--;
    }
    if (warp[ ].op.pipetarget == DUAL_ISSUABLE)
      ;
    else if (warp[ ].op.pipetarget == MAD_PIPE && balance < 0)
      warp[ ].coweight += WARP_OP_BONUS;
    else if (warp[ ].op.pipetarget == SFU_PIPE && balance > 0)
      warp[ ].coweight += WARP_OP_BONUS;
    // now feed warp[ ].coweight into the comparison network
```

Figure 7B:
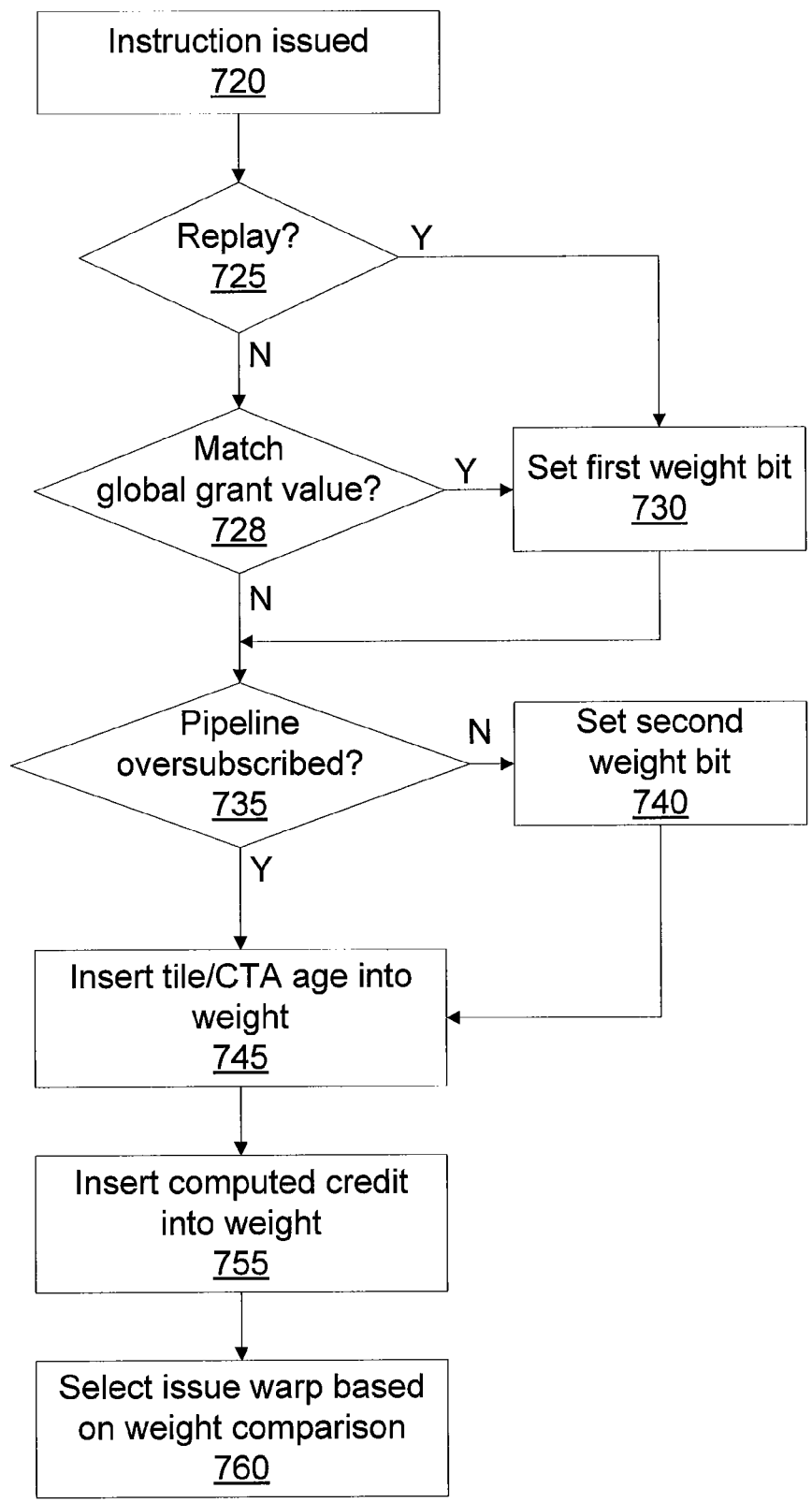
FIG. 7B is a flow diagram of method steps for computing credit-based warp weights, according to one embodiment of the present invention.

FIG. 7B is a flow diagram of method steps for computing credit-based warp weights, according to one embodiment of the present invention. At step 700 the warp weight control unit 700 signals that an instruction has issued for a warp. At step 725 each warp weight unit 702 determines if an instruction that is eligible to issue for the warp is being replayed, and, if so in step 730 a first weight bit is set. Otherwise, at step 728 each warp weight unit 702 determines if an instruction that is eligible to issue for the warp has a TILE.PHASE.TEX value that matches the global grant value. When an instruction that is eligible to issue for the warp has a TILE.PHASE.TEX value that does match the global grant value in step 728, then at step 730 a first weight bit is set and the method proceeds to step 735. When no instruction that is eligible to issue for the warp has a TILE.PHASE.TEX value that does match the global grant value in step 728, then the method proceeds directly to step 735.

At step 735 each warp weight unit 702 determines if the processing pipe for a single-issue instruction is oversubscribed, and, if not, then at step 740 a second weight bit is set and the method proceeds to step 745. Otherwise, the method proceeds directly to step 745. At step 745 each warp weight unit 702 inserts the tile/CTA age into the weight. The tile/CTA age may be scaled prior to being inserted into the weight. At step 755 each warp weight unit 702 inserts the computed credit value into the weight. At step 760 the comparison network 704 compares the weight values generated by each of the warp weight units 702 and selects an issue warp based on the weight comparison, i.e., having the greatest weight value.

The textile contract is enforced through the use of the TILE.PHASE.TEX value to improve cache locality since warps having a TILE.PHASE.TEX value matching the global grant are issued in sequential issue cycles. Instruction by instruction scheduling for the warps may be controlled through the use of per-warp credit values. so that a group of warps is processed uniformly. A credit is computed for each warp and the credit contributes to a weight for each warp. The weight is used to select instructions for the warps that are issued for execution.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disk read-only-memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention. The foregoing description and drawings are, accordingly, to be regarded in an illustrative rather than a restrictive sense.

The invention claimed is:

1. A method for computing credit values for groups of threads, comprising:
    adding a terminated warp credit amount to a slush-fund value upon terminating a warp;
    issuing a first instruction for execution by a first group of threads in a streaming multiprocessor during an issue cycle;
    determining a warp identifier associated with the first group of threads;
    updating a first warp credit for the first group of threads that is associated with the warp identifier;
    determining that he slush-fund value indicates that credit is available for addition to a second warp credit; and
    updating a second warp credit for a second group of threads that is associated with a different warp identifier in response to determining that the slush-fund value indicates that credit is available for addition to the second warp credit, the second group of threads having an eligible instruction ready for execution that was not issued for execution in the streaming multiprocessor during the issue cycle.

2. The method of claim 1, further comprising the steps of:
    determining a first weight value for the first group of threads based on the first warp credit;
    determining a second weight value for the second group of threads based on the second warp credit; and
    comparing the first weight value to the second weight value to select a second instruction for execution in the streaming multiprocessor by either the first group of threads or the second group of threads.

3. The method of claim 2, wherein a first tile identifier indicating a region of an image that is processed by the first group of threads contributes to the first weight value and a second tile identifier indicating a region of an image that is processed by the second group of threads contributes to the second weight value.

4. The method of claim 2, wherein a first phase identifier indicating a sequence of instructions for execution in the streaming multiprocessor that is the last sequence of instructions in a program or includes a cluster of non-dependent cache access instructions contributes to the first weight value and a second phase identifier indicating a sequence of instructions for execution in the streaming multiprocessor that is the last sequence of instructions in a program or includes a cluster of non-dependent cache access instructions contributes to the second weight value.

5. The method of claim 2, wherein an indication that an instruction eligible to issue for the first group of threads is being replayed contributes to the first weight value and an indication that an instruction eligible to issue for the second group of threads is being replayed contributes to the second weight value.

6. The method of claim 2, wherein the first weight value is based on a texture locality value that includes a tile value, a phase value, and a texture value, an age of a tile associated with the first instruction, and a factor indicating if a processing pipeline is oversubscribed.

7. The method of claim 1, further comprising the step of comparing the first credit value to the second credit value to select a second instruction for execution in the streaming multiprocessor by either the first group of threads or the second group of threads.

8. The method of claim 1, wherein determining that the slush-fund value indicates that credit is available for addition to the second warp credit comprises determining that the slush-fund value is greater than zero.

9. The method of claim 8, wherein updating the second warp credit for the second group of threads comprises incrementing the second warp credit by a second value.

10. The method of claim 9, further comprising decrementing the slush-fund value by a third value that is based on the second value.

11. The method of claim 10, wherein the third value is equal to a number of victimized threads multiplied by the second value.

12. The method of claim 1, wherein issuing a first instruction for execution by a first group of threads in a streaming multiprocessor during an issue cycle comprises issuing the first instruction together with a second instruction, wherein the first instruction and the second instruction are both associated with a single phase value, a single tile value, and a single texture.

13. A computer-readable storage medium storing instructions that, when executed by a streaming multiprocessor computes credit values for groups of threads that are executed in the streaming multiprocessor, by performing the steps of:
    adding a terminated warp credit amount to a slush-fund value upon terminating a warp;
    issuing a first instruction for execution by a first group of threads in the streaming multiprocessor during an issue cycle;
    determining a warp identifier associated with the first group of threads;
    updating a first warp credit for the first group of threads that is associated with the warp identifier;
    determining that the slush-fund value indicates that credit is available for addition to a second warp credit; and
    updating the second warp credit for a second group of threads that is associated with a different warp identifier in response to determining that the slush-fund value indicates that credit is available for addition to the second warp credit, the second group of threads having an eligible instruction ready for execution that was not issued for instruction in the streaming multiprocessor during the issue cycle.

14. The non-transitory computer-readable storage medium of claim 13, further comprising the steps of:
    determining a first weight value for the first group of threads based on the first warp credit;
    determining a second weight value for the second group of threads based on the second warp credit; and
    comparing the first weight value to the second weight value to select a second instruction for execution in the streaming multiprocessor by either the first group of threads or the second group of threads.

15. The non-transitory computer-readable storage medium of claim 14, wherein an indication that an instruction eligible to issue for the first group of threads is being replayed contributes to the first weight value and an indication that an instruction eligible to issue for the second group of threads is being replayed contributes to the second weight value.

16. The non-transitory computer-readable storage medium of claim 13, further comprising the step of comparing the first credit value to the second credit value to select a second instruction for execution in the streaming multiprocessor by either the first group of threads or the second group of threads.

17. A system for computing credit values for groups of threads that are executed in a streaming multiprocessor, the system comprising:
a warp scheduler and instruction unit configured to:
add a terminated warp credit amount to a slush-fund value upon terminating a warp;
issue a first instruction for execution by a first group of threads in a streaming multiprocessor during an issue cycle;
determine a warp identifier associated with the first group of threads;
update a first warp credit for the first group of threads that is associated with the warp identifier;
determine that the slush-fund value indicates that credit is available for addition to a second warp credit; and
update a second warp credit for a second group of threads that is associated with a different warp identifier in response to determining that the slush-fund value indicated that credit is available for addition to the second warp credit, the second group of threads having an eligible instruction ready for execution that was not issued for execution in the streaming multiprocessor during the issue cycle.

18. The system of claim 17, further comprising a memory storing instructions that, when executed by the streaming multiprocessor, configures the streaming multiprocessor to:
issue the first instruction;
determine the warp identifier;
update the first warp credit; and
update the second warp credit.

19. The system of claim 17, wherein the warp scheduler and instruction unit is further configured to:
determine a first weight value for the first group of threads based on the first warp credit;
determine a second weight value for the second group of threads based on the second warp credit; and
compare the first weight value to the second weight value to select a second instruction for execution in the streaming multiprocessor by either the first group of threads or the second group of threads.

20. The system of claim 19, wherein a first tile identifier indicating a region of an image that is processed by the first group of threads contributes to the first weight value and a second tile identifier indicating a region of an image that is processed by the second group of threads contributes to the second weight value.

21. The system of claim 19, wherein a first phase identifier indicating a sequence of instructions for execution in the streaming multiprocessor that is the last sequence of instructions in a program or includes a cluster of non-dependent cache access instructions contributes to the first weight value and a second phase identifier indicating a sequence of instructions for execution in the streaming multiprocessor that is the last sequence of instructions in a program or includes a cluster of non-dependent cache access instructions contributes to the second weight value.

22. The system of claim 19, wherein an indication that an instruction eligible to issue for the first group of threads is being replayed contributes to the first weight value and an indication that an instruction eligible to issue for the second group of threads is being replayed contributes to the second weight value.

23. The system of claim 17, wherein the warp scheduler and instruction unit is further configured to compare the first credit value to the second credit value to select a second instruction for execution in the streaming multiprocessor by either the first group of threads or the second group of threads.

* * * * *

UNITED STATES PATENT AND TRADEMARK OFFICE
CERTIFICATE OF CORRECTION

PATENT NO. : 9,189,242 B2
APPLICATION NO. : 12/885299
DATED : November 17, 2015
INVENTOR(S) : John Erik Lindholm et al.

Page 1 of 1

It is certified that error appears in the above-identified patent and that said Letters Patent is hereby corrected as shown below:

IN THE CLAIMS:

Column 20, Line 31, Claim 13, please add --non-transitory-- before "computer-readable".

Signed and Sealed this
Thirty-first Day of May, 2016

Michelle K. Lee
*Director of the United States Patent and Trademark Office*